UNITED STATES PATENT OFFICE.

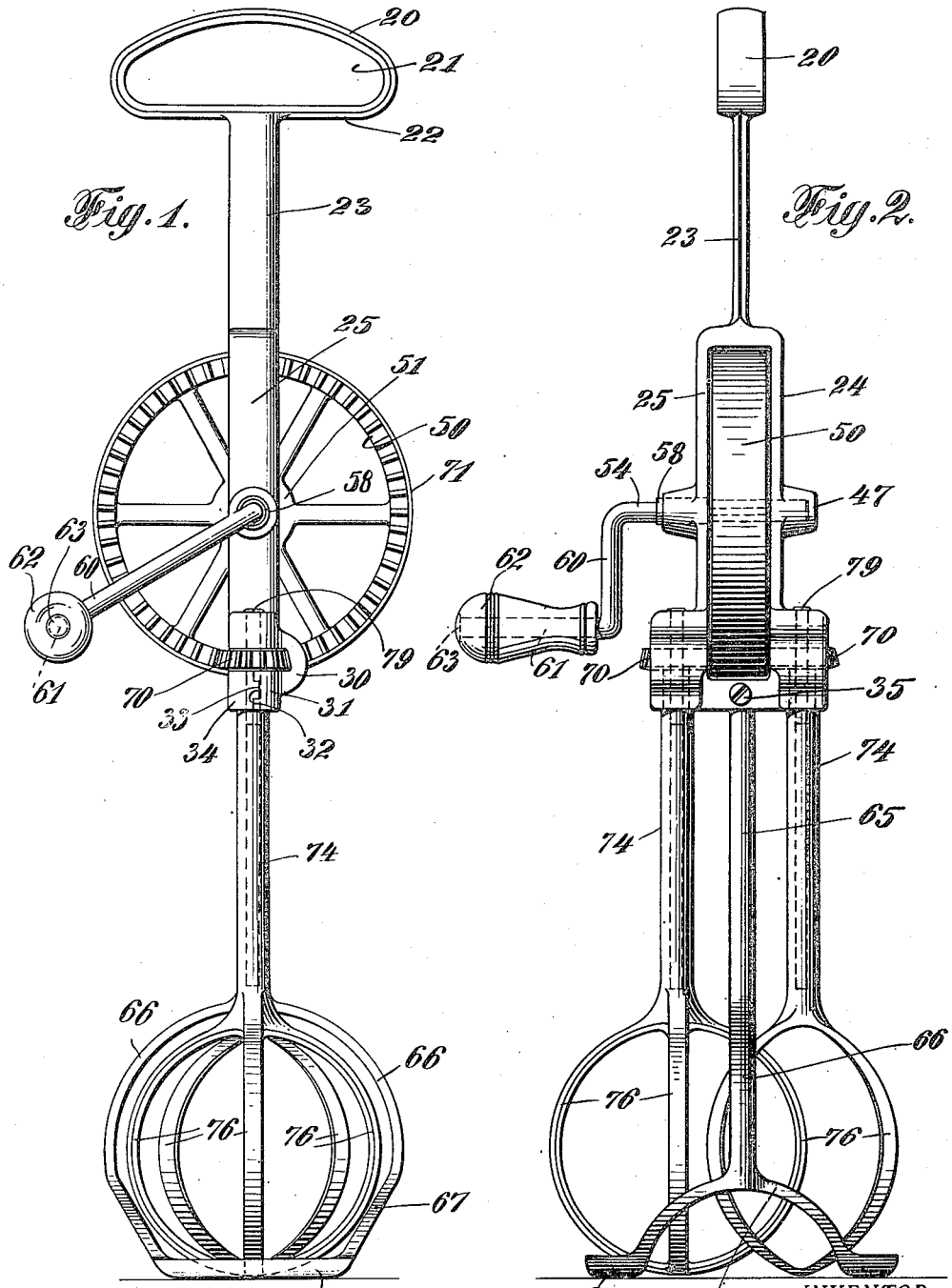

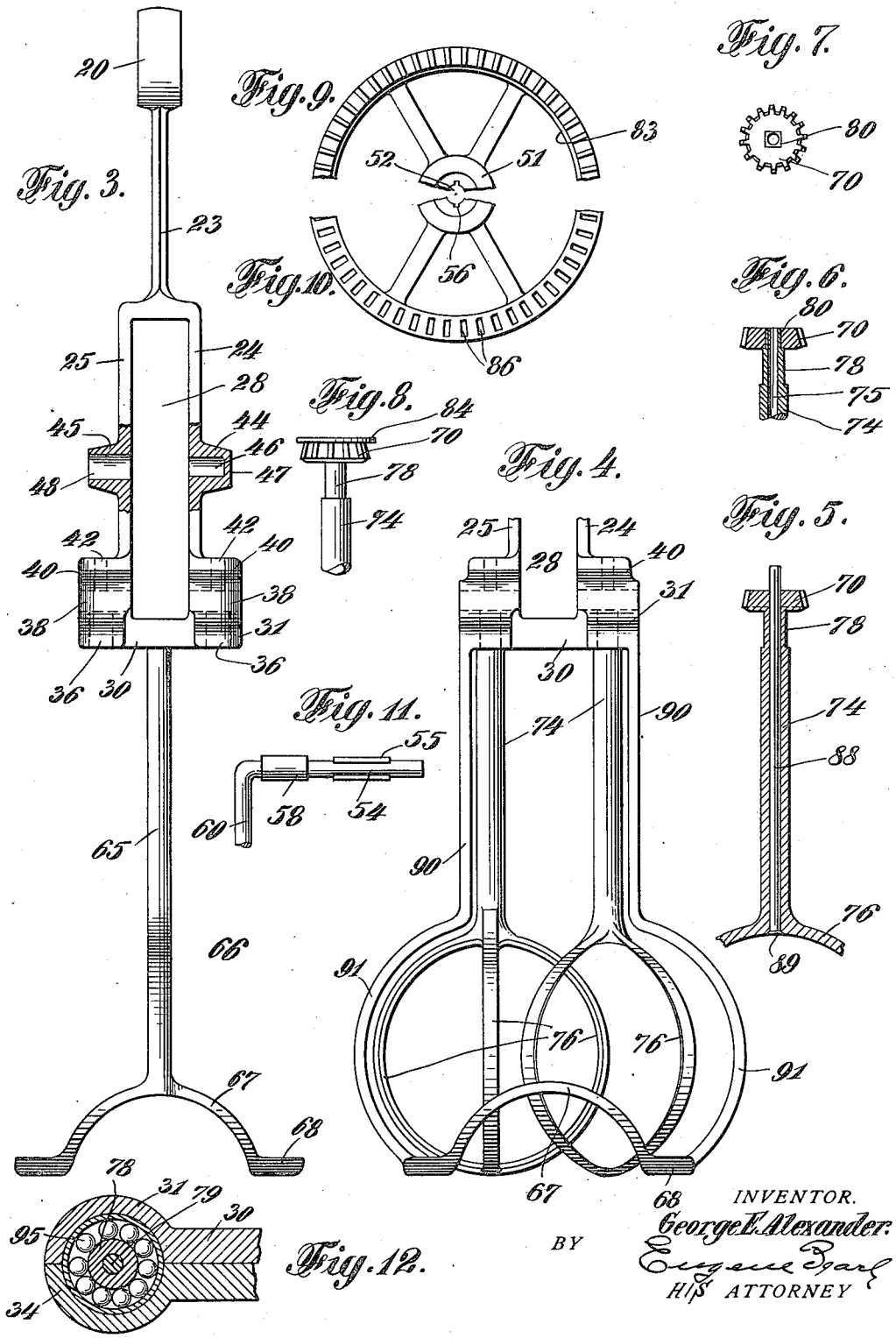

GEORGE E. ALEXANDER, OF NEW YORK, N. Y.

BEATER AND MIXER.

1,263,014.　　　　Specification of Letters Patent.　　Patented Apr. 16, 1918.

Application filed November 15, 1917. Serial No. 202,155.

*To all whom it may concern:*

Be it known that I, GEORGE E. ALEXANDER, a citizen of the United States, residing in New York, in the county of New York and State of New York, have invented certain new and useful Improvements in Beaters and Mixers, of which the following is a specification.

This invention relates to improvements in beaters or mixers, and particularly to types adapted for culinary purposes whereby material within a bowl or like container may be beaten and mixed to any desired extent by manual operation.

The principal object of the invention is to provide a beater comprised of a relatively low number of simple parts, so designed that the same may be made by processes of die-casting, thus at once securing uniformity of parts and avoiding mechanical operations in the finishing of the same.

A further object is to provide a beater in which the rotating beating elements may intimately approach the bottom of the container, thereby permitting a small quantity of material to be operated upon in a satisfactory manner.

A still further object is to provide means whereby the beaters may be suspended in a novel manner and without the use of guides or supports at their lower extremities.

These and other like objects are attained by the novel construction and combination of parts hereinafter described and shown in the accompanying drawings, forming a material part of this specification, and in which:—

Figure 1 is a side elevational view of a beater made in accordance with the invention.

Fig. 2 is a similar side elevational view taken in another plane.

Fig. 3 is a partial elevational and sectional view showing the beater frame.

Fig. 4 is a side elevational view indicating a modification of the support means employed.

Fig. 5 is a fragmental vertical sectional view taken through one of the stems of the beater blades.

Fig. 6 is another fragmental sectional view showing a modified form of stem and pinion.

Fig. 7 is a top plan view of the same.

Fig. 8 is a fragmental side elevational view showing a modified form of beater pinion.

Fig. 9 is a fragmental plan view showing one type of driving gear.

Fig. 10 is a similar plan view indicating another type of driving gear.

Fig. 11 is a side elevational view showing a part of the operating crank, and

Fig. 12 is another transverse sectional view showing the application of antifrictional bearings to the beater supports.

In carrying out the invention it is preferred to form a handle with an arcuate upper element 20, having an eye 21 in which the fingers of the operator may be placed or a better grip obtained by closing the fingers and hand to inclose the lower element 22, of the handle, with which is formed a stem 23, having at its lower end side arms 24 and 25, inclosing a rectangular open space 28, the ends of the arms being joined by an offset bridge 30, having extensions 31, across the ends of which are transverse recesses 32, receptive of tenons 33, formed with a yoke 34, which is secured by a single central screw 35. Contained partially in the yoke and extensions are openings 36, arranged parallel and which act as journals or bearings as will be hereafter described.

Immediately above the extensions 31, partially separated by the recess 38, are similar extensions 40, containing openings 42, of smaller diameter than the openings 36 with which they are in register.

Formed with the arm 24, is a boss 44, a similar boss 45, being on the arm 25, the boss 44 having an opening 46, leading from the space 28, covered by an integral portion 47, a similar but larger opening 48 extending through the boss 45, both being in axial alinement. A gear wheel 50, having extending side hubs 51, occupies the space 28 between the arms, and formed through the hubs is an opening 52, receptive of the spindle 54, having oppositely disposed keys 55, formed by pressing the material of the spindle, and fitted to the key ways 56 of the gear 50. The inner end of the spindle is suited to turn in the opening 46 and a sleeve 58, secured upon the spindle before the keys are raised, is revolubly received within the opening 48.

Beyond the sleeve or bushing 58, the spindle is bent at a right angle, forming an arm 60, the arm being of a length to provide leverage for turning the gear, after which the arm is bent outward parallel with the spindle 54, the out-turned element 61, being received within a revoluble handle 62, which is held on the extreme end of the element 61, by upsetting and forming a head 63.

A rod 65, which may be formed with the bridge 30, as indicated in Fig. 3, or with the yoke 34, as may be preferred, extends down to an arch 66 terminating in the upper portion of arcuate elements 67, having feet 68, adapted to make contact with the interior of the receptacle in which the material is to be beaten and which furnishes a support for the apparatus permitting it to be pressed downward.

Engaged with the gear 50, are pinions 70, the same being disposed in the recesses 38, the lower edges of the pinions resting normally upon a flange 71, formed circumjacent to the teeth so that the pinions are supported thereby, or by resting directly on a seat formed by the combined bridge and yoke. These pinions 70 may be integrally formed with extending hollow stems 74, the openings 75 of which act to lighten the construction, and have formed at their lower ends oppositely disposed pairs of beater blades 76, substantially oval in cross-section, the lower extremities extending downward to a point coincident with the bottom of the feet 68, so as to operate upon the smallest possible quantity of material.

The upper portion of the stem 74 have necks 78, revoluble within the bearings 36 and are held in operative position therein by means of pins 79 extending through the openings 42, and engageable within the central axial bores 75 of the stems. As a modification, the upper ends of the stems may be extended into a square or rectangle 80, the pinions 70, having corresponding rectangular openings to receive the extensions which are slightly riveted therein.

Modifications of the gear wheel are shown in Figs. 9 and 10, in the former of which a flange 83 is formed at the inner ends of the teeth, engageable with which is a disk 84, formed with the pinions at the outer ends of their teeth, the lower side of the disk riding upon the flange by means of which the pinions are supported.

In the modification shown in Fig. 10, in place of teeth, a plurality of equally spaced slots 86, are formed through the rim of the gear, with which are engageable the teeth of the pinions 70 without the use of any flange whatever.

In the modification shown in Fig. 4, in place of the central support 65, elements 90 are formed at the exterior of the projections 31, the same extending down and connecting with arcuate members 91, which in turn engage with the feet 68. In other respects the construction is as before described.

In Fig. 5, the stem 74 is formed with a through axial opening and secured to the frame by a rod 88 having a head 89 at its lower end and which may be upset at the top in the manner of the pins 79.

In the modification shown in Fig. 12, a ball or roller bearing 95 is used in which the necks 78 of the stems are journaled and it will be obvious that these bearings may be incorporated in the device if so desired.

From the foregoing it will be evident that all parts of the beater may be formed by ordinary method of die casting, thereby assuring uniformity and low expense in construction.

Having thus described my invention, what I claim as new and desire to secure by Letters Patent, is:—

1. In a beater the combination with a frame, of a single center support engaged with said frame, a pair of spaced arcuate terminals formed at the base of said support, adapted to hold said frame erect, a pair of parallel stems journaled vertically in said frame, beater blades formed with said stems, the lowermost part of said blades being in a horizontal plane coincident with the extremities of said arcuate terminals, a gear journaled transversely in said frame, means for actuating said gear, and pinions formed on the upper ends of said stems engageable with said gear.

2. In a beater the combination with a frame, of a laterally disposed base integral with said frame, transverse recesses formed in said base, a yoke having tenons engageable in said recesses, a pair of stems rotatably mounted in vertical bearings formed partially in said yoke and said base, a gear rotatably mounted transversely in said frame above said base, means for rotating said gear, pinions on said stems engageable with said gear, opposed pairs of beater blades formed with the lower ends of said stems, a center support extending from said base downwardly between said stems, and spaced feet formed at the lower end of said support, said feet being co-incident with the lowermost part of said beater blades and adapted to prevent the overturning of said frame.

3. In a beater, the combination with a frame, a rectangular recess formed vertically therein, an integral bridge formed at the bottom of said recess, a yoke engaged with said bridge, said yoke and bridge having parallel openings transverse to said recess, a gear revolubly mounted in said recess, means for rotating said gear, stems revoluble in said vertical openings, pinions formed with said stems, said pinions being engageable laterally with said gear, seats formed with said yoke and said bridge for supporting said pinions, beater blades on said stems, a single support extending downwardly from said bridge, co-incidently with the extremities of said beater blades and means formed with said supports for holding said frame normally erect.

In testimony whereof, I have signed my name to this specification.

GEORGE E. ALEXANDER.